United States Patent
Schurig

(10) Patent No.: US 7,072,407 B2
(45) Date of Patent: Jul. 4, 2006

(54) COMBINATION POWER AND FULL DUPLEX DATA CABLE

(75) Inventor: Alma K. Schurig, Cedar Hills, UT (US)

(73) Assignee: Brookline Flolmstead LLC, Las Vegas, NV (US)

( * ) Notice: Subject to any disclaimer, the term of this patent is extended or adjusted under 35 U.S.C. 154(b) by 828 days.

(21) Appl. No.: 09/753,747

(22) Filed: Dec. 27, 2000

(65) Prior Publication Data

US 2002/0037054 A1 Mar. 28, 2002

Related U.S. Application Data

(60) Provisional application No. 60/179,060, filed on Jan. 31, 2000.

(51) Int. Cl.
*H04B 3/00* (2006.01)
*H04L 25/00* (2006.01)

(52) U.S. Cl. .................. 375/257; 375/259; 375/295

(58) Field of Classification Search ............... 375/257, 375/258, 259, 295, 377; 333/21 R, 222, 333/243, 258; 370/270, 299
See application file for complete search history.

(56) References Cited

U.S. PATENT DOCUMENTS

| | | | |
|---|---|---|---|
| 3,860,748 A | 1/1975 | Everhart et al. ............... 178/6 |
| 3,987,240 A | 10/1976 | Schultz ........................... 178/6 |
| 4,839,531 A * | 6/1989 | Stemmons et al. ........... 307/17 |
| 4,897,841 A | 1/1990 | Gang, Jr. .................. 370/85.13 |
| 4,947,389 A | 8/1990 | Eng et al. ................. 370/85.12 |
| 5,033,112 A | 7/1991 | Bowling et al. ............. 455/603 |
| 5,148,144 A | 9/1992 | Sutterlin et al. ............. 340/310 |
| 5,202,780 A | 4/1993 | Fussganger ................. 359/125 |
| 5,420,858 A * | 5/1995 | Marshall et al. ............ 370/352 |
| 5,428,806 A * | 6/1995 | Pocrass ....................... 710/104 |
| 5,477,091 A | 12/1995 | Fiorina et al. ................ 307/66 |
| 5,559,377 A | 9/1996 | Abraham |
| 5,572,517 A | 11/1996 | Safadi .......................... 370/50 |
| 5,600,644 A | 2/1997 | Chang et al. ............... 370/404 |
| 5,699,276 A | 12/1997 | Roos .......................... 364/514 |
| 5,701,120 A | 12/1997 | Perelman et al. ...... 340/825.02 |
| 5,847,751 A | 12/1998 | Safadi ............................. 348/7 |
| 5,867,484 A | 2/1999 | Shaunfield ................... 370/254 |
| 5,896,385 A | 4/1999 | Achilleoudis ............... 370/443 |
| 5,910,954 A * | 6/1999 | Bronstein et al. ........... 370/401 |
| 5,920,802 A | 7/1999 | Bellows et al. .............. 455/3.3 |
| 5,926,101 A | 7/1999 | Dasgupta ............... 340/825.02 |
| 5,950,111 A * | 9/1999 | Georger et al. ............ 455/3.01 |
| 5,960,411 A | 9/1999 | Hartman et al. .............. 705/26 |
| 5,963,556 A | 10/1999 | Varghese et al. ............ 370/401 |
| 5,978,373 A | 11/1999 | Hoff et al. ................... 370/392 |
| 5,982,767 A | 11/1999 | McIntosh .................... 370/352 |
| 5,982,854 A | 11/1999 | Ehreth ........................ 379/56.2 |
| 5,994,998 A | 11/1999 | Fisher et al. ........... 340/310.01 |

(Continued)

*Primary Examiner*—Jean B Corrielus

(57) ABSTRACT

Systems, methods, and devices related to data converters are provided. In one particular embodiment, a network system data converter is provided. The network system data converter can include a first port that connects to a first cable for receiving data transmitted in a first signal transmission type, circuitry arranged and configured to convert the data from the first signal transmission type to a second signal transmission type and to transmit the converted data and power within the network system and, a second port that connects to a second cable for transmitting the data in the second signal transmission type and the power to a data device in the networks system. In one particular embodiment, the first signal transmission type can be differential data transmission and the second signal transmission type can be coaxial data transmission.

50 Claims, 8 Drawing Sheets

U.S. PATENT DOCUMENTS

| | | | |
|---|---|---|---|
| 6,009,097 A | 12/1999 | Han | 370/395 |
| 6,016,307 A | 1/2000 | Kaplan et al. | 370/238 |
| 6,023,467 A | 2/2000 | Abdelhamid et al. | 370/395 |
| 6,023,734 A | 2/2000 | Ratcliff et al. | 709/300 |
| 6,058,367 A | 5/2000 | Sutcliffe et al. | 705/1 |
| 6,079,020 A | 6/2000 | Liu | 713/201 |
| 6,085,249 A | 7/2000 | Wang et al. | 709/229 |
| 6,104,711 A | 8/2000 | Voit | 370/352 |
| 6,104,727 A | 8/2000 | Moura et al. | 370/468 |
| 6,112,251 A | 8/2000 | Rijhsinghani | 709/249 |
| 6,122,740 A | 9/2000 | Andersen | 713/200 |
| 6,130,879 A | 10/2000 | Liu | 370/230 |
| 6,140,911 A | 10/2000 | Fisher et al. | 340/310.01 |
| 6,144,399 A * | 11/2000 | Manchester et al. | 725/127 |
| 6,144,668 A | 11/2000 | Bass et al. | 370/401 |
| 6,151,629 A | 11/2000 | Trewitt | 709/227 |
| 6,169,741 B1 | 1/2001 | LeMaire et al. | 370/401 |
| 6,175,569 B1 | 1/2001 | Ellington, Jr. et al. | 370/401 |
| 6,249,528 B1 * | 6/2001 | Kothary | 370/466 |
| 6,667,967 B1 * | 12/2003 | Anderson et al. | 370/351 |
| 6,813,279 B1 * | 11/2004 | Trainin | 370/466 |

* cited by examiner

COMBINATION POWER AND FULL DUPLEX DATA CABLE

RELATED APPLICATIONS

This application claims priority to U.S. Pat. application Ser. No. 60/179,060 filed Jan. 31, 2000.

BACKGROUND OF THE INVENTION

1. Field of the Invention

The present invention relates to the field of Neighborhood Area Networks (NANs), and more specifically to NANs incorporating coaxial cable to increase the data rate and distance of the NAN.

2. Description of the Related Art

Local area networks (LANs), including ATM, Frame Relay, and Token Ring, are very successful in providing data communication and are used throughout the industry. Numerous LANs use the Ethernet standards set forth by the IEEE 802.3. Under this standard, 100Base-TX (100 Mbit) baseband data signals are transferred over unshielded twisted pairs (UTP) such as Cat-5. Under Ethernet standards, transmission distances are limited to the IEEE 802.3-specified 100 meter maximum. The 100 meter maximum is based upon CSMA/CD collision domain and Cat-5 attenuation criteria. When significantly longer distances are required, fiber optic cable is employed.

Fiber optic cable has much higher capital and outdoor installation costs in order to protect the delicate fibers. Fiber transceiver nodes are also more expensive than for UTP, such as Cat-5. Consequently, economics have encouraged the widespread proliferation of 100Base-TX Cat-5-based LAN systems. Fiber optic systems are typically used only for longer trunk lines between work groups. Fiber cable is also limited in that it is a dielectric material and cannot conduct electrical power. Thus, fiber cable cannot be used to supply electric power to remote sites.

LANs usually employ a conventional AC power system to supply power to hubs, repeaters, switches, and other network components. Installation of certain components must be made in locations that are not conveniently located near AC power sources. In such conditions, power must be supplied either by installing separate power wires, by using batteries, or by employing the Cat-5 wiring itself.

A Cat-5 cable contains four (4) twisted pairs with a first pair for uplink signals and a second pair for down link signals. The third and/or fourth pairs are usually unused but may be used for power distribution. The amount of power that can be so transferred is limited by the resistance of the Cat-5 wire, which may be approximately 9–10 ohms per 100 meters. The amount of transferable power is also limited by the dielectric and electrical code limitations on voltage range. The voltage range may be approximately 24–60V, depending on the jurisdiction.

In practicality, the total equivalent resistance for the power circuit comprises the sum of the source and return wire resistances. For example, a six (6) Watt switch operating at 3.3 V consumes nearly 2A, which in turn dictates that a 100 meter length of Cat-5 cable would drop nearly 34 V and 60 Watts in the wire alone. U.S. Pat. No. 5,994,998 describes an alternate technique for using the signal pairs in a Cat-5 cable to carry power. This reduces the resistance by a factor of two (2). However, this technique is impractical for longer distances because of the degradation of the signal to noise ratio. Such degradation is caused by increased noise generated by power supply current through greater lengths of cable in addition to the decreased signal level. Another disadvantage of this technique is the high cost of quality inductors. The relatively expensive inductors are required to isolate signals from power without seriously altering the delicate IEEE 802.32u specification for 100Base-TX signals.

Another data transmission system providing power distribution is the Community Antenna TV (CATV) systems. The CATV is not a LAN in the Ethernet sense and usually carries signals as modulated radio frequency (RF) in the down link direction rather than bi-directional baseband data signals. The CATV employs a power distribution system to power RF amplifiers at periodic distances to compensate for attenuation at VHF and UHF frequencies. Amplifier system power is usually supplied by AC or DC power distribution systems comprising either: 1) the outer shield and inner conductor of the cable itself; or 2) separate power wires running with the cable.

U.S. Pat. No. 3,987,240 describes a CATV power system of the first method in which DC power of one polarity is coupled to the center conductor of a coaxial cable. The opposite polarity is coupled to the shield of the coaxial cable. The high frequency TV signals are also conducted over the same coaxial cable with high quality chokes and filters used to separate the power from the RF signals at the amplifiers. The disadvantage of the first method is the relatively high cost and quality of the chokes and filters required to effectively separate the power from the RF in the face of power system noise and transients. The second method uses separate power distribution wires to avoid the costs of quality chokes and filters.

As networking of computers increases, the demand for NANs has likewise increased. A NAN differs from a LAN in that a NAN averages greater distances between users and requires a server having greater capacity. A NAN may therefore exceed the 100 meter maximum length specified by the IEEE for Cat-5 cable. A NAN further differs form a LAN in that the NAN requires that a power distribution system be integrated with the data distribution system to power boosters, repeaters, hubs and switches. A NAN also differs from a LAN in that the NAN deploys outdoor aerial and underground burial techniques and technology. Both aerial and underground burial techniques are required to give a NAN the flexibility for networking residences and businesses in neighborhoods.

Given the requirements of NANs, the conventional Cat-5 cable with RJ-45 connectors has too many inherent limitations to be acceptable for use in many NAN embodiments. As an alternative, coaxial cable has advantages over Cat-5 cable such as lower impedance and lower attenuation. For example, the attenuation of low loss coaxial cable is 60% less than that of Cat-5 (to 100BaseTX signals) and provides a 40–50% increase in range. Coaxial cable is also mechanically a hardier connection due to the thicker spacing in its shielding and sheath. Moreover, coaxial cable is more robust and more resistant to physical impact than Cat-5 cable. Coaxial cable is, therefore, superior in enduring environmental conditions, including without limitation underground burial. In light of the advantages of coaxial cable, the typical NAN would benefit from successful incorporation of coaxial cable therein. However, conventional specifications do not support the use of coaxial cable in a NAN.

It would, therefore, be an advancement in the art to provide a robust NAN system that extends data transmission distances beyond industry standards. It would be a further advancement in the art to provide a NAN system that uses coaxial cable to better resist environmental conditions. It would be yet another advancement in the art to provide a NAN system that interfaces with Cat-5 cable. Moreover, it would be an advancement in the art to provide such a system at a relatively low cost. Such a system is disclosed and claimed herein.

SUMMARY OF THE INVENTION

The present invention provides a dual coaxial data and DC power transmission system that exceeds transmission distances found with use of conventional Cat-5 cable. Since the 802.3u specification is not usable for the coaxial media, the present invention provides a converter for converting 100BaseT differential Cat-5 (100 ohm impedance signals) to single ended coaxial (50 ohm impedance) signals and back again.

The present invention integrates power distribution throughout the coaxial cables of a NAN to remote sites. The shield of one coaxial cable may be the positive polarity and the shield of a second coaxial cable may be the negative polarity of the NAN power system. Due to the relatively low resistance of shielding and the use of high voltage switching regulators, system power may be distributed over a 4,000 foot segment of coaxial cable. Power distribution in the shields further reduces noise input into the center conductor and improves signal to noise ratios for data transmission. The capability of providing 4,000 foot long NAN distribution segments permits convenient and economical installation of distribution boxes at central locations for connection to AC line power taps, as well as, uplinks to the NAN servers.

A coaxial cable may be placed in electrical communication with a converter to convert the coaxial data to differential data. The differential data is then transmitted to a local Cat-5 cable that is in communication with a local destination. The converter further receives differential data from the Cat-5 cable, converts it to coaxial data, and transmits the coaxial data to the coaxial cable. In one embodiment, the converter may further include an amplifier to boost the coaxial data into the coaxial cable. Such boosting overcomes the attenuation caused by the comparatively longer transmission distances. The converter further receives and transmits system power between the coaxial cable and the power bus. System power may be directed across the Cat-5 cable to power local devices at a destination in the network. System power may also be directed from the converter to power other network devices in communication with the converter, such as a switch. The NAN system may employ a switch in communication with the converter to route data and system power to one of a plurality of coax cables to arrive at a specific destination.

The present invention provides a system to integrate power and data into a typical NAN. The present invention extends the distance of individual data segments between switches, pedestals and aerial boxes, beyond the industry-specified maximums. The NAN system of the present invention extends the range for power distribution such that the NAN system requires at least ten (10) times fewer power taps from power utilities. The NAN system provides increased reliability and economy of data and power distribution cables. The NAN system further converts Cat-5 differential data signals to single ended coaxial cable signals to thereby extend range and to take advantage of the hardy coaxial cable reliability.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DESCRIPTION OF THE PREFERRED EMBODIMENTS

The presently preferred embodiments of the present invention will be best understood by reference to FIGS. 1–8, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 8, is not intended to limit the scope of the invention, as claimed, but is merely representative of presently preferred embodiments of the invention.

Figure 1:
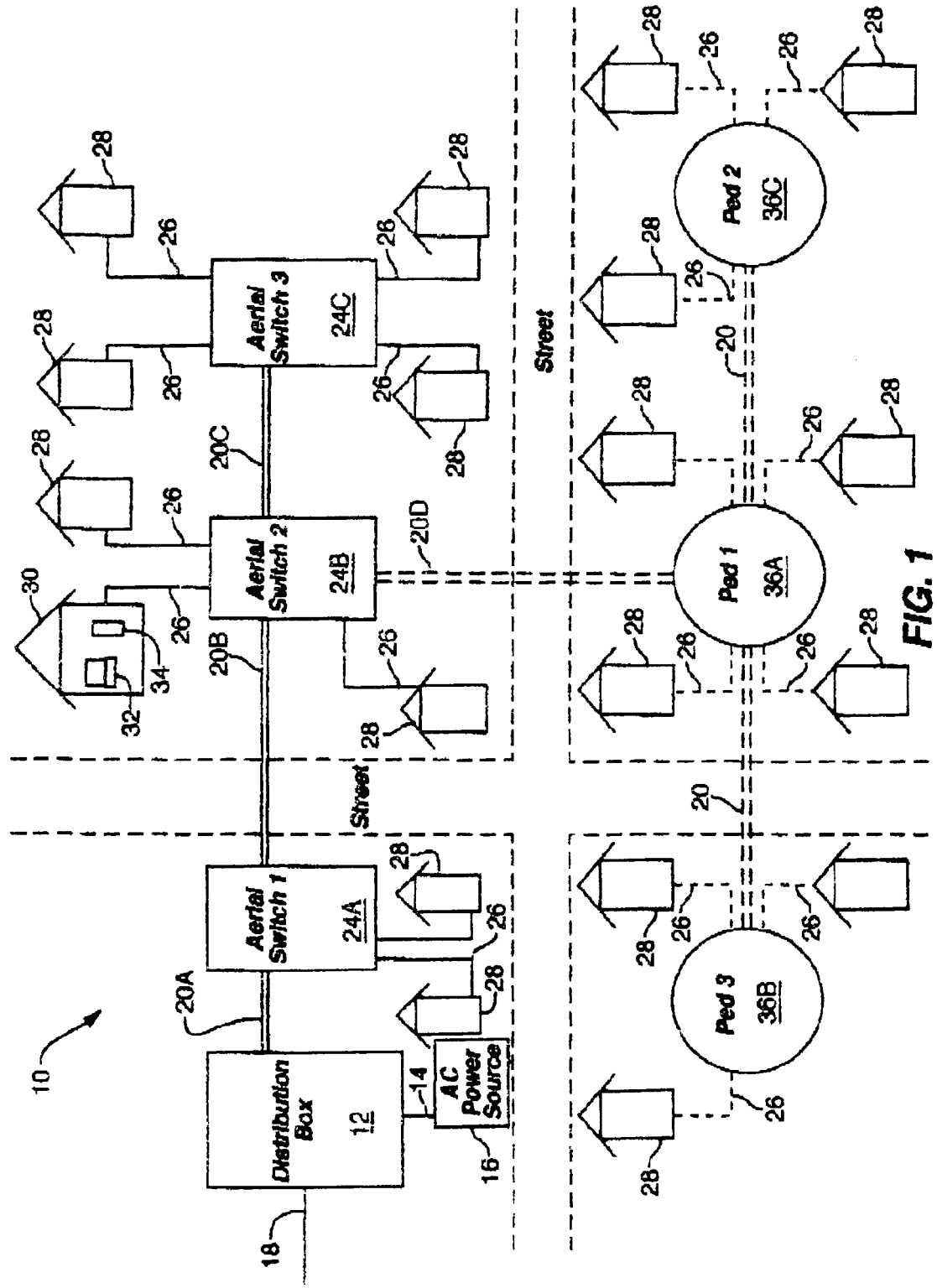
FIG. 1 is a block diagram of a NAN power and data distribution system.

Referring to FIG. 1, a diagram of one embodiment of a NAN 10 of the present invention is shown. The NAN 10 is configured to distribute both data and power throughout its various segments. The NAN 10 includes a distribution box 12 which may be in electrical communication with a power drop 14 such as an AC power drop 14. The AC power drop 14 may receive metered AC power from an AC power source 16 such as a utility company service line or generator.

The distribution box 12 may further be in electrical communication with an uplink 18 to enable communication with another device or network. In one embodiment, the uplink 18 may be configured to interface with a fiber optic network (not shown). As such, the distribution box 12 may be configured with switching equipment for communicating between the fiber optic network and the segments of the NAN 10.

The distribution box 12 is in communication with a coaxial cable 20A to supply power and data to one or more segments of the NAN 10. In the embodiment of FIG. 1, the coaxial cable 20A is disposed aerially although one of skill in the art will appreciate that the coaxial cable 20A may be disposed in a variety of environments including being buried or underwater. Aerial disposition is a convenient method to traverse a street or other right-of-way. Disposed aerially, the coaxial cable 20A is in communication with an aerial switch 24A. The aerial switch 24A receives data and power from the coaxial cable 20A. The aerial switch 24A, in turn, transfers the power and data through a port to another coaxial cable 20B. Additional coaxial cables 20 may be included in the NAN 10, as needed, to complete various segments. One of skill in the art will therefore appreciate that an aerial switch 24 may be in communication with one or more coaxial cables 20, as needed, by design.

The aerial switch 24 may also be configured to deliver power and data to one or more Cat-5 cables 26 to downlink data to the Cat-5 cable 26. The Cat-5 cable 26 may be directed to a respective destination 28. The destination 28 may be a residence, office, or other location where data transmission is desired. Destinations 28 are used to house network devices which are configured to interface with a Cat-5 cable 26.

Similar to coaxial cable 20A, additional coaxial cables 20B, 20C are in electrical communication with aerial switches 24B, 24C. Additional aerial switches 24B, 24C are incorporated into the NAN 10 as needed to transfer data and power to destinations 28. Each aerial switch 24 may be configured to transfer power and data to Cat-5 cables 26 or to other coaxial cables 20. As shown, the Cat-5 cables 26 provide the transmission segment between the aerial switches 24 and the destinations 28. In this manner, additional coaxial cables 20 and aerial switches 24 may be introduced into the NAN 10 to serve a geographical area. One of skill in the art will appreciate that the number of aerial switches 24 shown in FIG. 1 is for illustrative purposes and the actual number will vary based on the network design.

Destination 30 illustrates equipment which may be placed in communication with the NAN 10. For example, a conventional personal computer 32 may be in electrical communication with an interface card 34. The interface card 34 is in turn connected to the Cat-5 cable 26. The destination 30 generically represents one of various network devices served by the NAN 10. Other network devices may include printers, facsimile machines, scanners, terminals, and so forth. One of skill in the art will appreciate that the Cat-5 cable 26 may communicate with these and other network devices. The destination 30 may also house a plurality of computers 32, which may communicate with the NAN 10. The destination 30 may further house a LAN to interface with the NAN 10.

FIG. 1 further illustrates buried components and segments of the NAN 10. The distribution box 12 or aerial switch 24 may be in communication with a buried coaxial cable 20 to provide a downlink for data and power to other portions of the NAN 10. In the NAN 10 of FIG. 1, a buried coaxial cable 20D is shown in communication with an aerial switch 24B and a pedestal mounted switch 36A. A pedestal mounted switch 36 is typically configured to provide underground switching and perform similarly to an aerial switch 24.

The pedestal mounted switch 36A may further be in communication with other pedestal mounted switches 36B, 36C through coaxial cables 20 to provide power and data to destinations 28. As in the aerial embodiments, the pedestal mounted switch 36 may provide a downlink for data to destinations 28 through communication with Cat-5 cables 26. The Cat-5 cables 26 may be disposed underground and provide the segment between the pedestal mounted switch 36 and the destination 28.

One of skill in the art will appreciate that any number of switches 24, 36 and cables 20, 26 may be incorporated into the NAN 10. All such variations are included within the scope of the present invention. A given switch 24, 36 may provide a downlink for as many additional switches 24, 36 as feasible. As defined herein, a switching node is a network device having the ability to direct or redirect data and power to an intended destination. Thus, the switches 24, 36 may be termed switching nodes. A segment is defined herein as a distance traversed by power or data in the NAN 10. A segment may be embodied by the coaxial cable 20 or by the Cat-5 cable 26.

The suitable number of switches 24, 36 and ultimate length of segments is determined by power supply size, switch power consumption, average network loading per customer, number of customers per distribution segment, and repeater latency for specific applications. Power sources may be installed, wherever needed, to supply power to remote locations of the NAN 10. AC power may be supplied by additional power drops 14; or AC power may be distributed by a power bus or extra wires in the coaxial cable 16.

Figure 2:
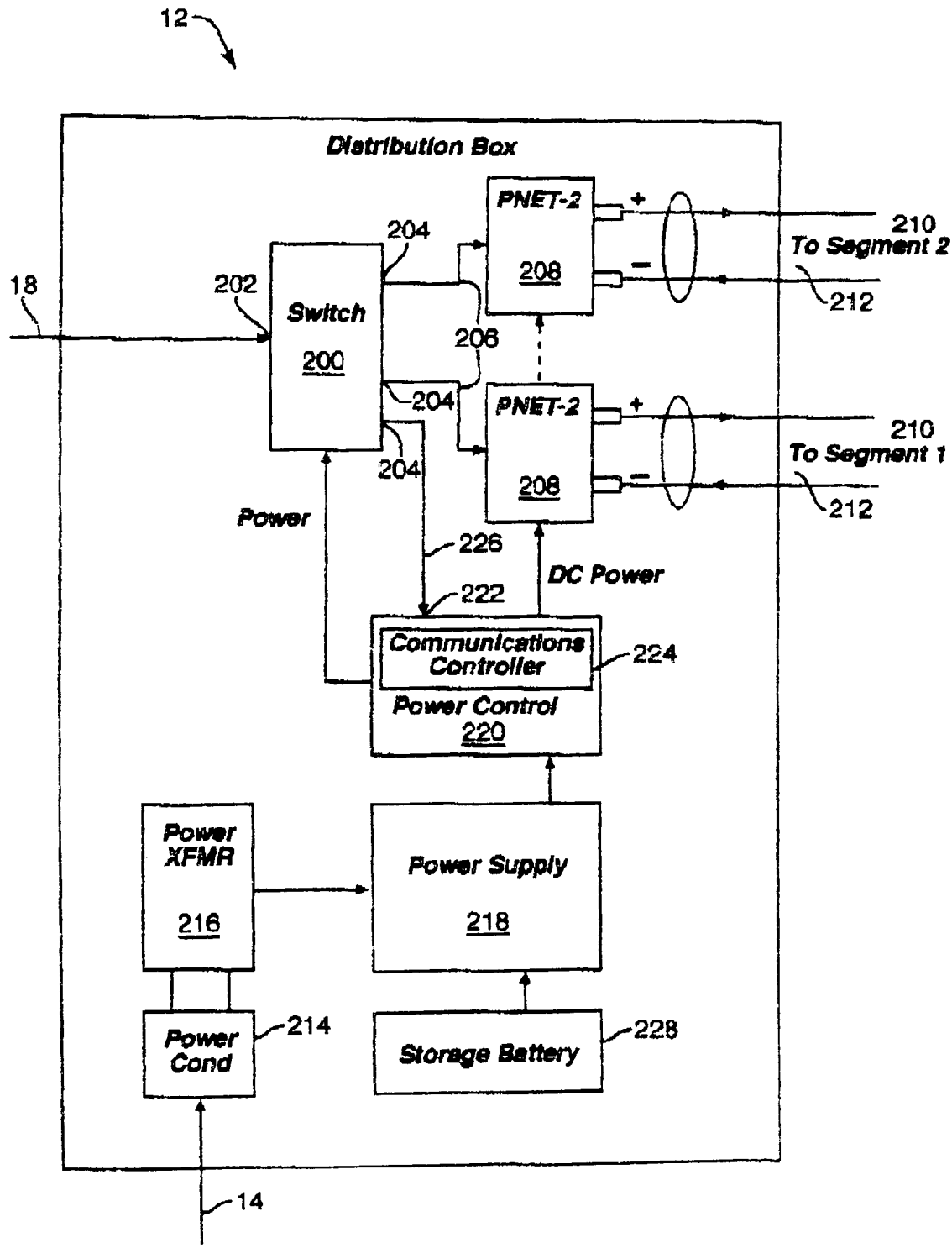
FIG. 2 is a block diagram of one embodiment of a distribution box for use with the NAN system of the present invention.

Referring to FIG. 2, a block diagram of one embodiment of a distribution box 12 is shown. The distribution box 12 includes a switch 200 which is in communication with the uplink 18 through an uplink port 202. The switch 200 further includes one or more downlink ports 204, which are operably connected to Cat-5 cables 206 to provide downlinks for the power and data.

The distribution box 12 further includes a Power Network (PNET) converter 208. The PNET converter 208 converts differential data received from the Cat-5 cable 206 into dual coaxial data suitable for transmission on a dual coaxial cable. The PNET converter 208 further receives system power from a power control 220 and converts the system power into dual coaxial power.

The distribution box 12 may be configured to serve any reasonable number of distribution segments 210. As shown in FIG. 2, the distribution box 12 is operably connected to two (2) distribution segments 210. One of skill in the art will appreciate that the number of distribution segments 210 may vary depending on the number of downlink ports 204. A distribution segment may include a dual coaxial cable 212, which is operably connected to a corresponding PNET converter 208 to provide the conversion from Cat-5 cable 206.

The power for the distribution segments 210 may be supplied by any of a variety of methods from the AC power drop 14. In one embodiment, the AC power drop 14 is in electrical communication with a power conditioner 214. The power conditioner 214 is configured to filter out transients, limit current for fault conditions, and supply conditioned AC power to a power transformer 216. In one embodiment, the power transformer 216 transforms the incoming AC power to 48 VAC and supplies this to a power supply 218. The power supply 218 converts the AC voltage to filtered and regulated DC voltage. The regulated DC voltage is then passed to the power control 220.

In the depicted embodiment, the power control 220 is configured to supply DC voltage to the PNET converter 208 and to the switch 200. The power control 220 may be further configured to run diagnostic operations to monitor power supply over the distribution segments 210. The power control 220 may include a network port 222 and a communications controller 224. The network port 222 allows for electrical communication of the power control 220 with a Cat-5 cable 226 that is typically in communication with the switch 200. The communications controller 224 is typically in communication with the network port 222 to access network administration resources provided by the switch 200. The power control 220 provides remote power control to permit cycling of power to network devices within a distribution segment 210. When network devices become partially or completely disabled by electrostatic energy, lightning, or connection transients, the network devices may be reset by cycling power.

The distribution box 200 may further include a storage battery 228 that contains a reserve of DC voltage. The storage battery 228 delivers DC voltage to the power supply 218, as required, in the event of an interruption of power from the AC power drop 14.

Figure 3:
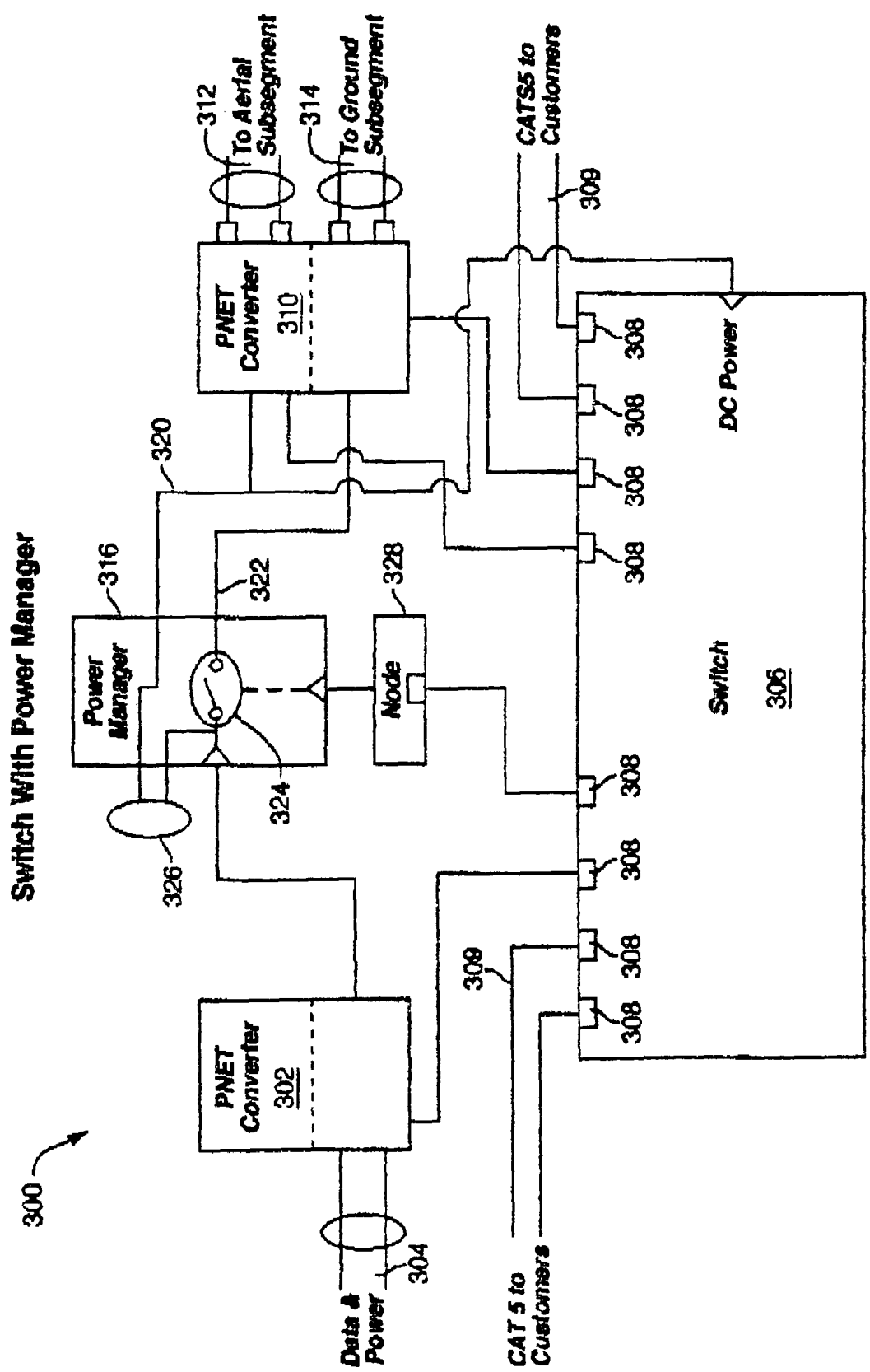
FIG. 3 is a schematic diagram of one embodiment of an aerial or pedestal switch assembly for use with the NAN system of the present invention.

Referring to FIG. 3, a block diagram of an aerial switch or pedestal mount switch 24, 36 is shown and is generally designated as switch assembly 300. The switch assembly 300 includes a PNET converter 302, which is operably connected to an uplink coaxial cable 304 to provide an uplink interface. The uplink coaxial cable 304 may be considered a component of an uplink segment. As such, the coaxial cable 304 may be operably connected at its opposing end to the distribution box 12 or to another switch assembly 300. The PNET converter 302 converts received dual coaxial data to Cat-5 differential data.

In the depicted embodiment, the PNET converter 302 is in electrical communication with a switch 306 for transmitting differential data compatible with Cat-5 cables. The switch 306 is typically configured with sufficient intelligence to enable routing of data packets. The switch 306 may be configured with a plurality of ports 308, such as eight (8) ports as shown in FIG. 3. The switch 306 may be configured with more than eight (8) ports 308, but typical installations use an eight (8) port switch 306 for reasons of economy. In one embodiment, the switch 306 is configured to support full duplex 100 Mbps (200 Mbps total) nonblocking internal bus architecture. Although pricing for 100 Mbps technology is presently attractive, evolution to gigabit speeds for cost and performance is anticipated. Additionally, the components described in FIG. 3 may be combined into a single board to eliminate cable connectors, decrease cost, and increase reliability.

The switch 306 may be connected through its ports 308 to one or more Cat-5 cables 309, which ultimately lead to destinations 28. The Cat-5 cables 309 may be considered downlink segments with respect to the switch assembly 300. In the depicted embodiment, the switch 306 is configured to route data to appropriate destinations based on addresses within the received data packets. The switch 306 may also be in communication with a second PNET converter 310, which converts received differential data into coaxial data. The PNET converter 310 may be operably connected to one or more coaxial cables 312, 314 which may be considered components of downlink segments.

The switch assembly 300 may further include a power manager 316 configured to enable remote control and remote diagnostics of power distribution to downstream segments of the NAN 10. The PNET converter 302 may receive power from the coaxial cable 304 and may transfer the power to the power manager 316.

In one embodiment, the power manager 316 may direct received power into an unmanaged line 320 and a managed line 322 by operation of a switch 324. By default the switch 324 may remain open. Power may be directed to the unmanaged line 320. The power manager 316 may include a resetable fuse 326 along the unmanaged line to protect segments of the NAN 10 from power supply shorts. Power may be directed through the unmanaged line 320 to the switch 306 to power the switch 306. The switch 306 may direct power to the Cat-5 cables 309 to provide power distribution to the cables 309. The power may further be directed along the unmanaged line 320 to the PNET converter 310 and to a coaxial cable 312. This configuration enables powering of the managed switch 306 during cycling of power to the coaxial cable 314.

The power may be directed to managed line 322 by operation of the switch 324. When the switch 324 is closed, the power is directed to the PNET converter 310 where it is transmitted to a segment 314. The power managers 316 are typically able to delay the powering up of certain segments, such as distant segments. In the embodiment of FIG. 3, the segment 314 is a segment to which power may be delayed by operation of the switch 324. By selective operation of the switch 324, closer switches 300 may be powered up without the loading effect of the more remote switches 300. In the depicted embodiment, after the closer switches 300 have powered up and stabilized their power consumption, then the power manager 316 automatically connects power through switch 324 to the more remote set of switches 300. Permitting network control and diagnostics of remote segments also enables faults to be remotely located and, if possible, remotely reset.

In one embodiment, the ratio of power managers 316 to regular switches 300 may be only 1 to 10. Thus, not all switches 300 need include a power manager 316. In embodiments where a power manager 316 is not included, the power is obviously not directed to managed and unmanaged lines and is, instead, passed directly to downlink segments. The switch assembly 300 may further include a pingable network node 328 for data system fault detection. The node 328 may be in electrical communication with the switch 306 and the power manager 316 to direct pings to the power manager 316.

Figure 4:
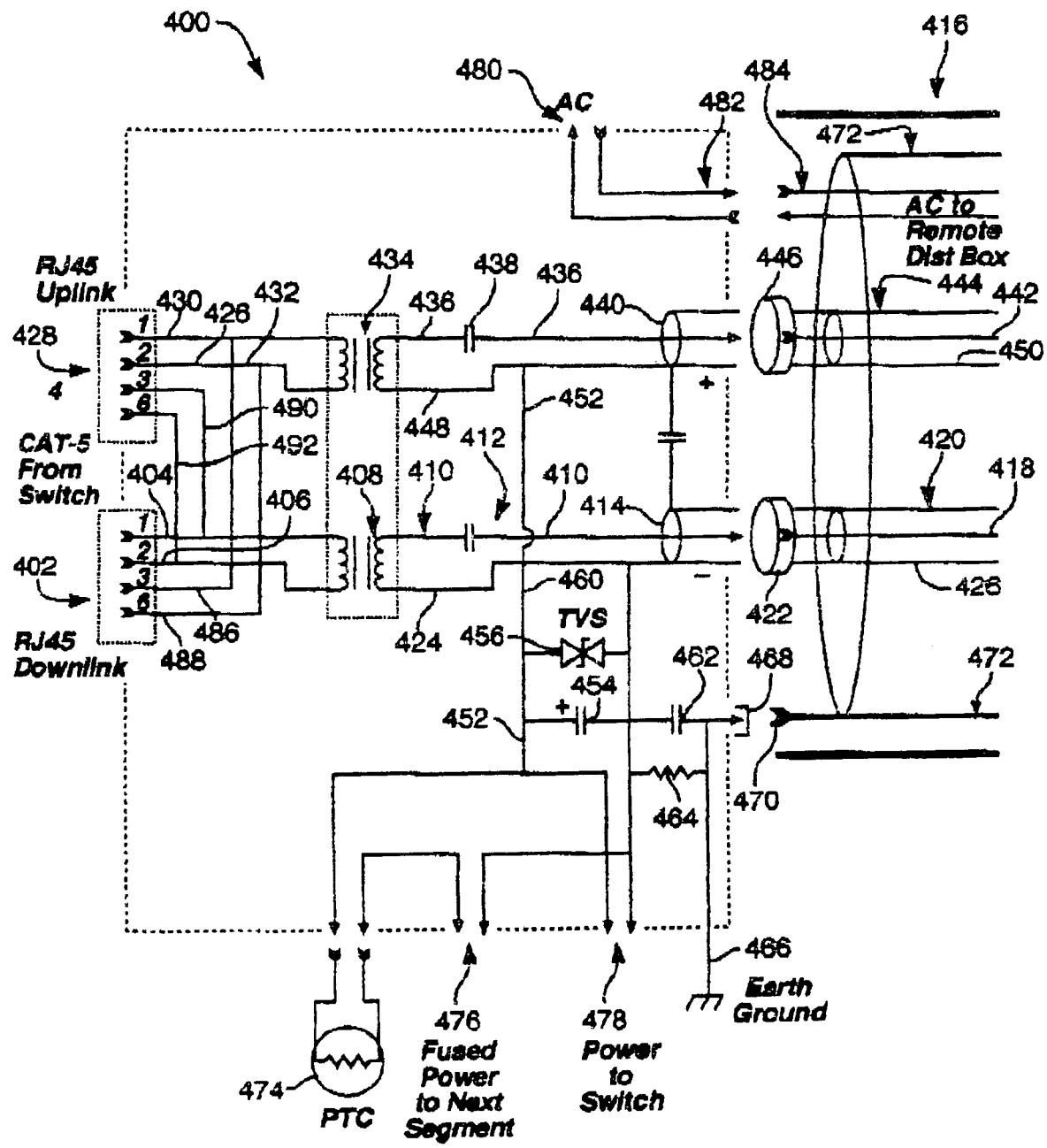
FIG. 4 is a schematic diagram of one embodiment of a PNET converter for use with the NAN system of the present invention.

Referring to FIG. 4, a schematic diagram of one embodiment of a PNET converter 400 is shown. The PNET converter 400 typically operates in both downlink mode and uplink mode. In the downlink mode, the PNET converter 400 converts differential data to coaxial data. The PNET converter 400 receives differential data and system power from a Cat-5 cable through downlink port 402. A pair of lines 404, 406 are typically placed in electrical communication with a twisted pair of Cat-5 cable for receiving differential data. In the depicted embodiment, the lines 404, 406 are in electrical communication with a transformer 408 that is configured to convert differential data to coaxial data. In one embodiment, a transformer 408 may be a Halo TG22-S012. The transformer 408 of the depicted embodiment is capable of receiving or transmitting IEEE 802.3u data and converting it to single ended 50 ohm impedance coaxial cable data, a medium that is not specified in the 802.3u specification.

The transformer 408 may be in electrical communication with a line 410, which may couple to a DC blocking capacitor 412 that may be approximately 0.01 uF. The blocking capacitor 412 permits transference of data packets, while restricting DC power and attendant 20 power supply noise. The line 410 continues after the blocking capacitor 412 to a downlink coaxial port 414. The downlink coaxial port 414 is typically configured to couple to a dual coaxial cable 416 to transmit coaxial data. More specifically, the downlink coaxial port 414 couples to a conductor 418 in a single coaxial cable 420 in the dual coaxial cable 416. The downlink coaxial port 414 may couple to the conductor 418 through a connector 422, such as a TNC connector. In the depicted embodiment, an additional line 424 is also in communication with the transformer 408 and the downlink coaxial port 414. The line 424 is typically placed in communication with a coaxial shield 426 of the single coaxial cable 420 through the downlink coaxial port 414 and the connector 422. The line 424 is able to transmit system power as it does not have a blocking capacitor.

In the depicted embodiment, the PNET converter 400 further includes an uplink port 428 for communication with a Cat-5 cable. A pair or lines 430, 432 may be in electrical communication with a twisted pair of a Cat-5 cable for transmitting differential data. The lines 430, 432 are in electrical communication with a transformer 434 that is configured to convert coaxial data to differential data. As with the transformer 408, the transformer 434 may be one section of a Halo TG22-S012.

The transformer 434 may be in electrical communication with a line 436 that couples to a DC blocking capacitor 438 that may be approximately 0.01 uF. The blocking capacitor 438 of the depicted embodiment passes data packets and restricts DC power and attendant power supply noise. The line 436 continues after the blocking capacitor 438 to an uplink coaxial port 440. The uplink coaxial port 440 is typically configured to couple to a conductor 442 of a single coaxial cable 444 of the dual coaxial cable 416. The uplink coaxial port 440 may couple to the single coaxial cable 444 through a connector 446, such as a TNC connector.

In the depicted embodiment, an additional line 448 is also in communication with the transformer 434 and the downlink coaxial port 440. The line 448 of the depicted embodiment is placed in communication with a coaxial shield 450 of the single coaxial cable 444 through the downlink coaxial port 440 and the connector 446. The line 448 is able to transmit system power as it does not have a blocking capacitor.

The dual coaxial cable 416 is configured to transmit coaxial data, in full duplex, through the conductors 418, 442 and to transmit system power through the coaxial shields 426, 450. In the present invention, the system power may be DC power. One coaxial shield, such as shield 450, may be designated as the positive polarity and the other coaxial shield, such as shield 426, may be designated as the negative polarity. The coaxial shields 426, 450 may be embodied as braided copper. The DC resistance of the braided copper shields 426, 450 is an order of magnitude less than for 24 gauge Cat-5 wire. Thus, by using high voltage switching regulators in network devices, a 60 VDC (100 W) distribution voltage can provide power for a 20 switch segment distributed over 4,000 feet of coaxial cable. A further advantage of coaxial shields for power distribution is that they reduce noise input into the conductors 418, 442 and thereby improve signal to noise ratios for data transmission. The capability of providing 4,000 foot long NAN distribution segments permits convenient and economical installation of distribution boxes at central locations for connection to AC line power taps as well as uplinks to NAN servers.

In the embodiment of FIG. 4, the line 448 may serve as the positive polarity for system power and the line 424 may serve as the negative polarity. Line 448 may be in communication with line 452 to direct system power to a filtering capacitor 454 and a transient voltage suppressor 456 that are parallel to one another. The filter capacitor 454 filters system power and the transient voltage suppressor 456 conditions the system power for transients. The PNET converter 400 may further include an additional filtering capacitor 458 to filter system power. The filtering capacitor 458 may be disposed between lines 448, 424.

The line 424 may be in electrical communication with line 460, which is also in communication with the filtering capacitor 454 and the transient voltage suppressor 456. The line 460 may further be in communication with a control capacitor 462 parallel to a resistor 464. The control capacitor 462 and the resistor 464 provide a controlled path from negative polarity or ground to earth ground 466. A ground connector 468 may be coupled to earth ground 466. The ground connector 468 may be placed in electrical communication with a ground wire 470 in the coaxial cable 416. The ground wire 470 may be in communication with a shield 472 in the coaxial cable 416 to ground the shield 472. The shield 472 surrounds both single coaxial cables 420, 444 for additional protection.

The PNET converter 400 may further include a resettable fuse 474, such as a positive temperature coefficient thermistor (PTC), in communication with line 452. The resettable fuse 474 of the depicted embodiment provides fuse protection for faults such as shorts to protect other power segments or branches from shorts. When the system power is turned off, the resettable fuse 474 cools down and is reset. If the short remains upon power reset, then the resettable fuse 474 trips again thereby preventing the shorted segment from killing power to the rest of the NAN 10.

The PNET converter 400 may further include a fused power connector 476 in electrical communication with the resettable fuse 420 and the filter capacitor 454 and the transient voltage suppressor 456. The fused power connector 476 may be configured to provide system power to other segments of the NAN 10.

The PNET converter 400 may further include another power connector 478 that may not be protected by a resettable fuse 474. The power connector 478 may be in communication with the filtering capacitor 454 and the transient voltage suppressor 456. The power connector 478 typically provides system power to certain devices such as the switch 306 in the switch assembly 300. In the embodiment of FIG. 3, the system power may be first directed through a power manager 316 before it is received in the switch 306.

In one embodiment, the PNET converter 400 may further include an auxiliary power connector 480 configured to receive DC or AC auxiliary power. The auxiliary power connector 480 is typically in electrical communication with a power port 482. The power port 482 is typically configured to enable electrical communication with auxiliary power wires 484 in the coaxial cable 416. In this manner, DC or AC power may be transmitted from a distribution box 12 or switch assembly 300 to another network device through the coaxial cable 416. The auxiliary power wires 484 permit a remote power box to be powered from a more conveniently located distribution box 12.

In one embodiment, the PNET converter 400 may further include additional lines 486, 488 that are in communication with the downlink port 402. The lines 486, 488 are typically in electrical communication with lines 430, 432 respectively. The lines 486, 488 may be placed in communication with a twisted pair of Cat-5 cable through the downlink port 402. In this manner, the lines 486, 488 may serve to upload differential data. Similarly, the PNET converter 400 may further include additional lines 490, 492 that are in communication with the uplink port 428 and lines 404, 406 respectively. The lines 490, 492 may be placed in communication with a twisted pair of Cat-5 cable through the uplink port 428. The lines 490, 492 may be used to download differential data to lines 404, 406 for conversion to coaxial data and transmission to coaxial cable 416. The additional lines 486, 488, 490, 492 serve as crossover connections to permit full duplex data communication through either downlink port 402 or uplink port 428 for further downloading and uploading and are together an optional feature of the present invention.

The PNET converter 400 of FIG. 4 is one embodiment for converting differential data to coaxial data and back again. The PNET converter 400 is further capable of receiving system power from Cat-5 cable or coaxial cable and distributing the power over other segments of the NAN 10. One of skill in the art will appreciate that the PNET converter 400 may be embodied in alternative ways and the embodiment of FIG. 4 is for illustrative purposes only. For example, methods for blocking and filtering system power may be achieved with or without the use of blocking or filtering capacitors. Other configurations for external connection of system power may also vary and would be included within the scope of the invention.

Figure 5:
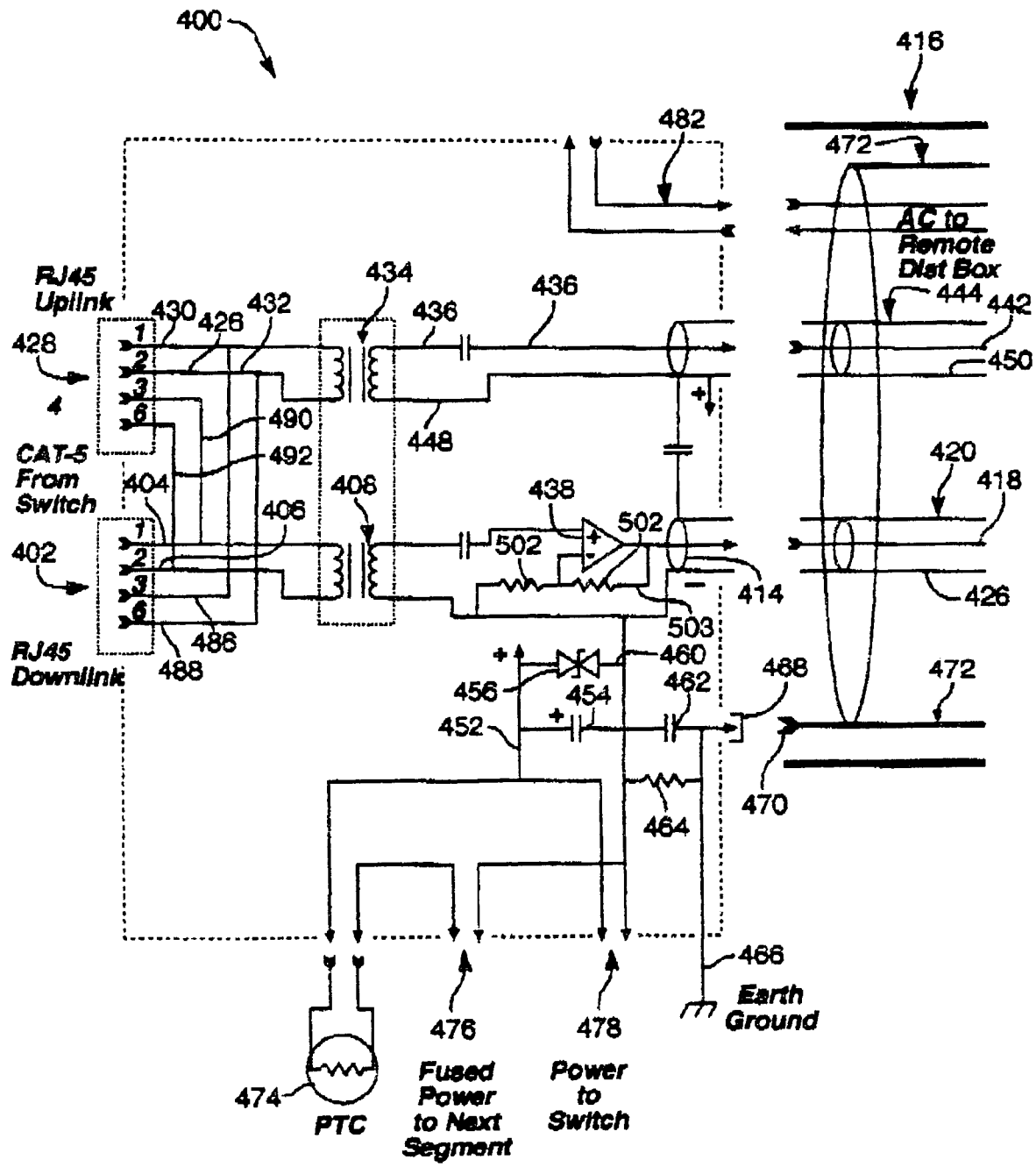
FIG. 5 is a schematic diagram of the PNET converter of FIG. 4 and further including an amplifier.

Referring to FIG. 5, a block diagram of an alternative embodiment of the PNET converter 400 is shown. In one embodiment, the PNET converter 400 further includes an amplifier 500 in electrical communication with the transformer and the downlink coaxial port connector 414. The amplifier 500 may be a wideband linear amplifier with 50 ohm output impedance for driving a 50 ohm coaxial cable 414. The gain of the amplifier 500 may be set by gain resistors 502 and 503 and is flat out to 100 MHZ. The gain compensates for attenuation in longer lengths of coaxial cable 414 and provides for extended cable lengths. Gain resistors 502 and 503 may also be replaced with a pre-emphasis network that boosts gain at higher frequencies where cable attenuation is greater.

Figure 6:
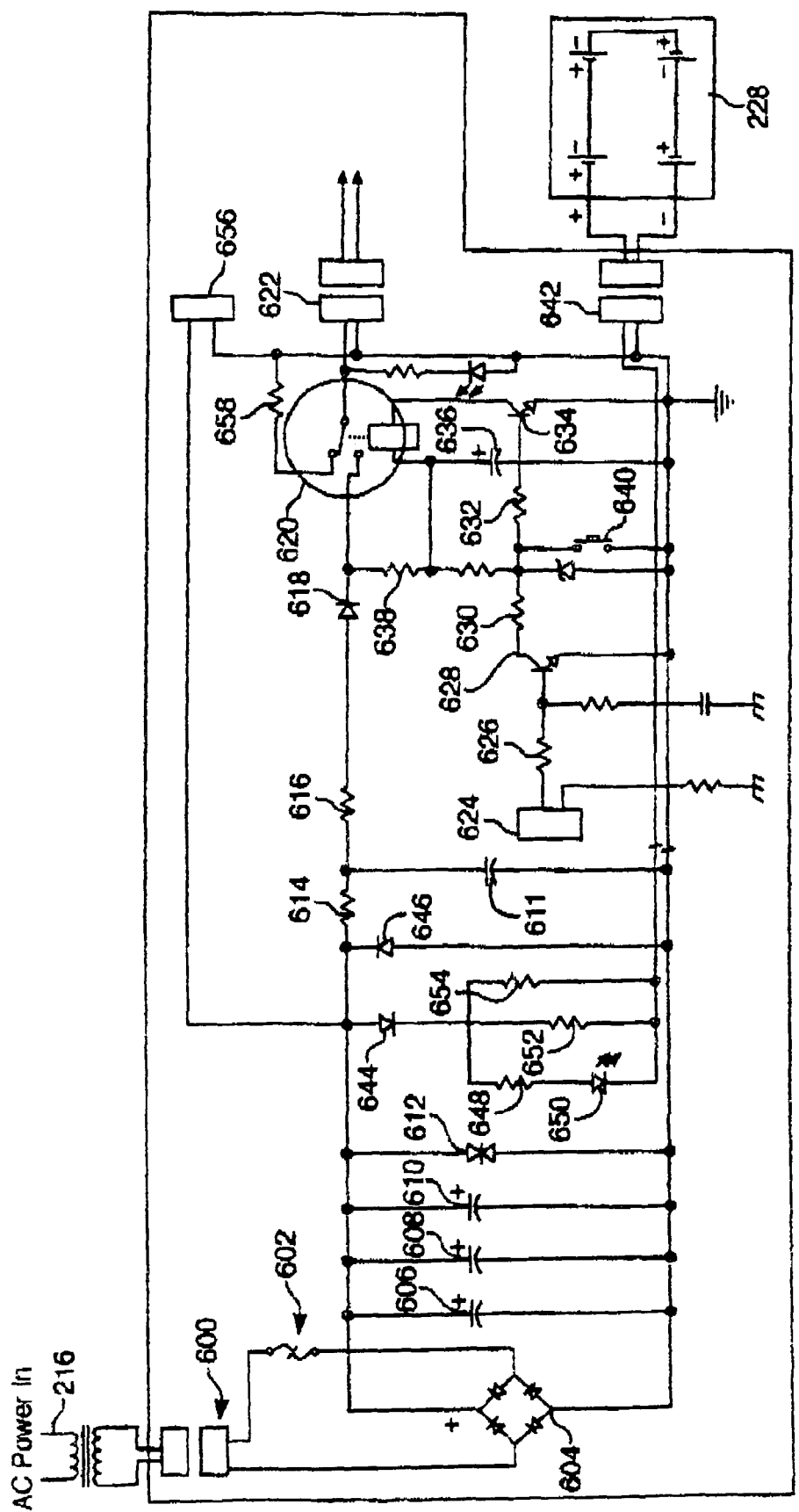
FIG. 6 is a schematic diagram of one embodiment of a power supply for use with the NAN system of the present invention.

Referring to FIG. 6, a schematic diagram of one embodiment of the power supply 218 of FIG. 2 are shown. The power supply 218 may be in electrical communication with the power transformer 216 through an electrical connector, such as a jumper 600. In the depicted embodiment, AC power from the power transformer 216 passes to the jumper 600 and is fused by a resettable fuse 602. The power may then be rectified by a rectifier 604 and filtered by capacitors 606, 608, 610, 611, diode 612, and resistors 614, 616.

The power is typically then steered by rectifier 618 and switched by relay 620 to power output connector 622. The relay 620 may be controlled by a latched microcontroller port pin that is in communication with a connector 624. A control signal received from the connector 624 passes through a resistor 626 and is inverted by transistor 628 and biasing resistors 630, 632. The inverted control signal then drives relay control transistor 634. The capacitor 636 and the resistor 638 provide a short time delay for turn on and off while switch 640 permits manual reset of the power output connector 622 by service personnel.

The power supply 218 is typically further in communication with a storage battery 228 through a connector 642. The storage battery 228 of the depicted embodiment provides backup power to run the distribution segment for hours in the event of a power line failure. Components 644, 646, 648, 650, 652, 654 form a charging circuit to charge the storage battery 228 during receipt of AC power. Diode 646 typically steers current from the storage battery 228 and an unmanaged load connector 656 to the power supply 218 during power outages. Resistor 658 of the depicted embodiment provides a "crowbar" short on the power output connector 622 to discharge switch power supplies more quickly during a power reset cycle. One of skill in the art will appreciate that the power supply 218 shown in FIG. 6 is for illustrative purposes only and the invention is not limited to this embodiment exclusively. Rather, the invention may be implemented through various embodiments of power supplies.

Figure 7:
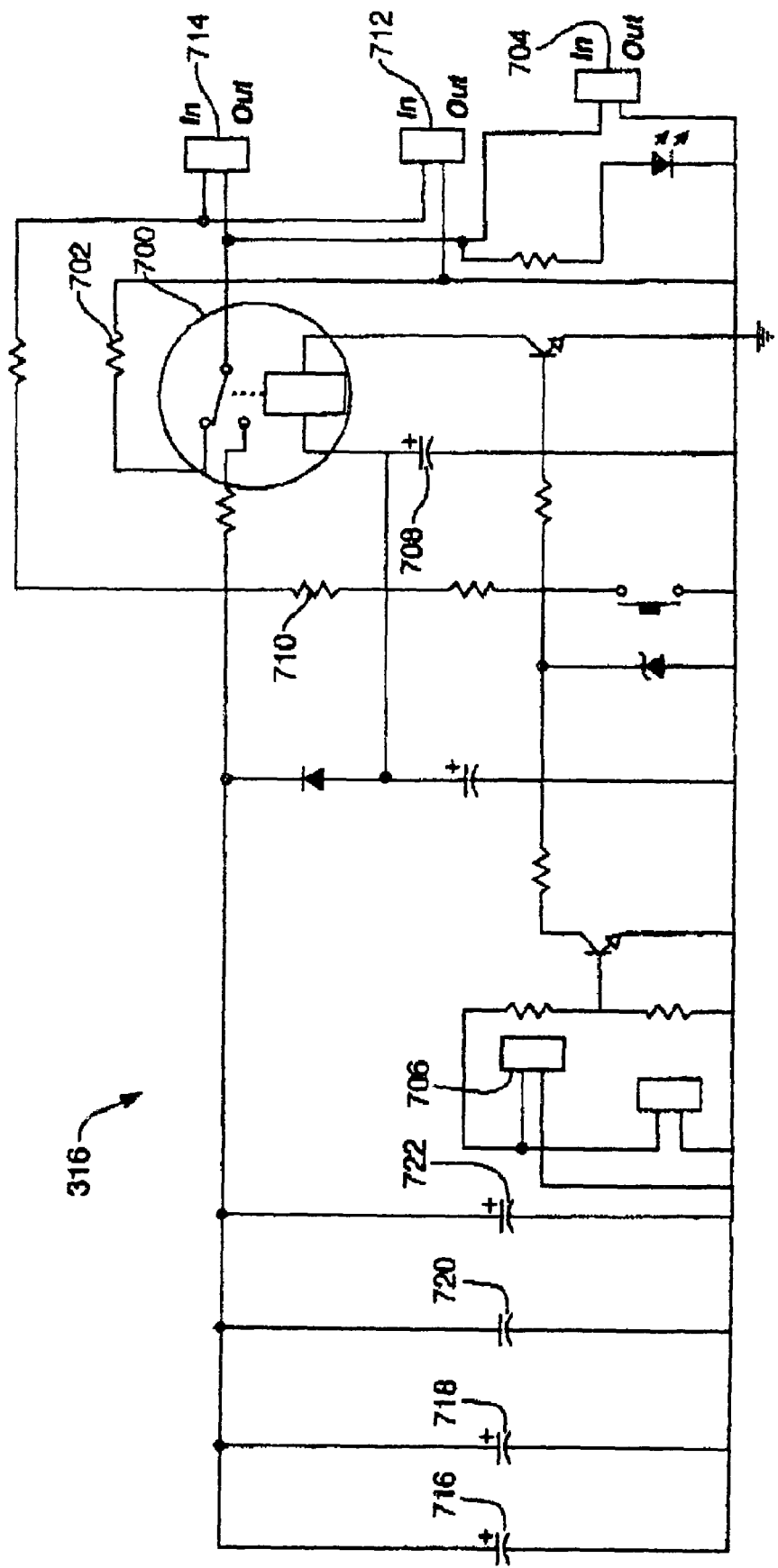
FIG. 7 is a schematic diagram of a power manager for use with the NAN system of the present invention.

Referring to FIG. 7, a schematic diagram of one embodiment of the power manager 316 of FIG. 3 is shown. The power manager 316 may include a circuit relay 700 with a crow bar resistor 702 for increasing the reset speed of switches and other loads in communication with the connector 704 on the downlink side of the power distribution system. In the depicted embodiment, the relay 700 is controlled by logic signals received through connector 706 and the time constants of capacitor 708 and resistor 710. In one embodiment, the time constant is set for 3–6 seconds to permit loads on the uplink side of connector 712 of the power manager 316 to come up to voltage before the managed segment connector 714 is permitted to be powered up. The power manager 316 may further include capacitors 716, 718, 720, 722 that store charge during uplink power up. When relay 700 is closed, the charge of capacitors 716, 718, 720, 722 helps boost the power up speed of the downlink loads.

Figure 8:
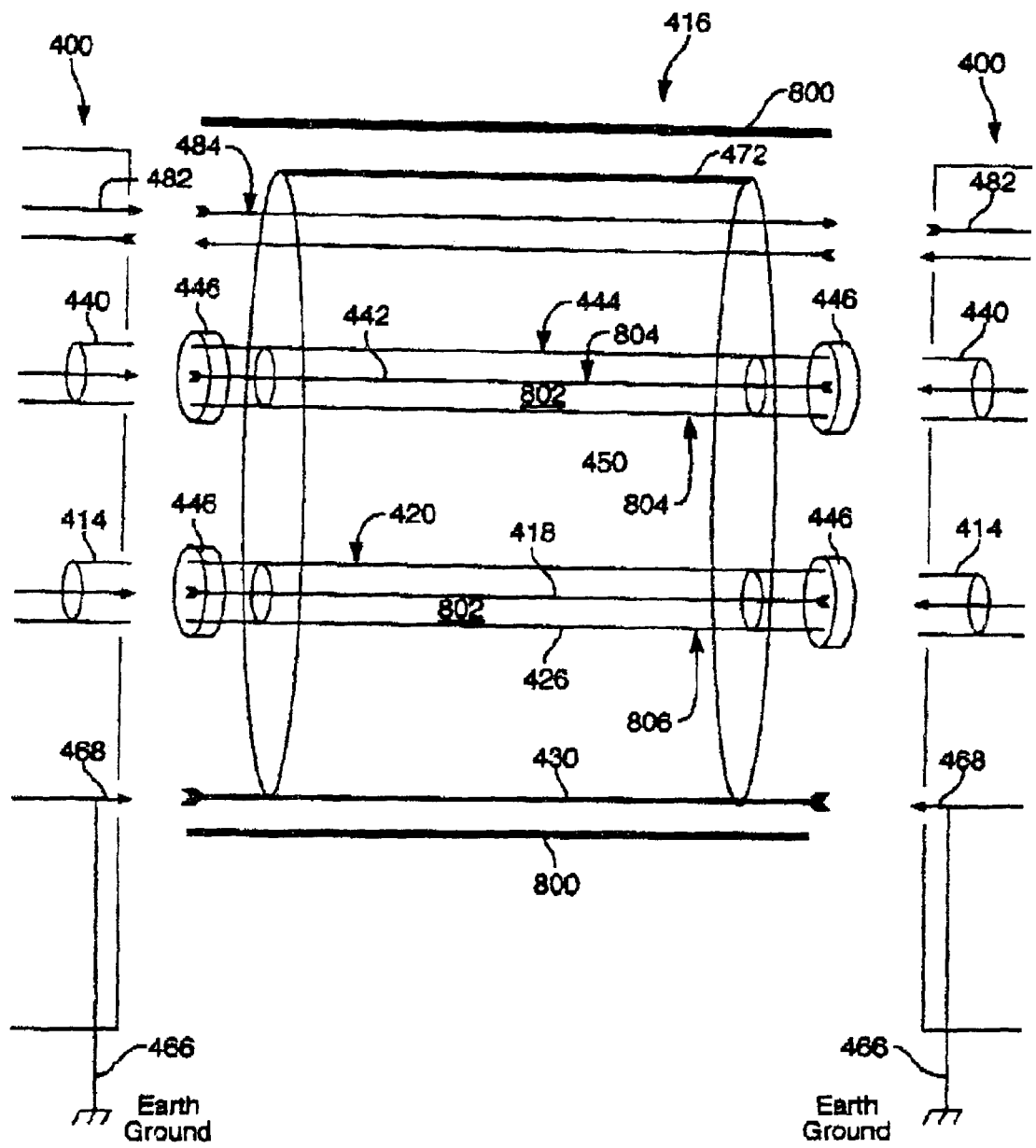
FIG. 8 is a schematic diagram of a dual coaxial cable for use with the NAN system of the present invention.

Referring to FIG. 8, a schematic diagram of one embodiment of a dual coaxial cable 416 suitable for a NAN 10 of FIG. 1 is shown. A practical NAN must employ economical, as well as, hardy/reliable signal and power distribution cable. The instant invention exceeds these requirements with a dual coaxial cable 416 with extra shielding and outdoor sheath. The overall cable 416 may be covered with a cable shield 472 for EMI and electrostatic discharge protection. The cable 416 may further include a heavy outer sheath 800 surrounding the cable shield 472. The cable 416 may further include auxiliary wires 484 to permit transmission of power to remote network power supplies and devices.

The single coaxial cables 420, 444 may be configured with a low loss dielectric 802 around center conductors 418, 442 to extend signal transmission range. Additionally, the single coaxial cables 420, 444 include coaxial shields 426, 450 having a heavy gauge braid for conducting system power and for greater hardiness. The single coaxial cables 420, 444 may each be contained within insulating sheaths 804, 806 that may be thicker than conventional sheathes to increase robustness. The single coaxial cables 420, 444 may be in communication with TNC connectors 446 to increase reliability and connection to coaxial ports 414, 440.

The dual coaxial cable is among the hardiest of outdoor network cable technologies. The heavy outer sheath 800 enables the cable 416, alternatively, to be sown underground with a vibratory plow or attached to aerial wiring systems. Buried dual coaxial cables are very resistant to garden shovel damage. Aerial mount dual coaxial cables are resistant to weather. Coaxial cable faults are easily diagnosed and repaired with field replaceable splices. Additionally, for a nominal cost, additional 16–18 gauge wires may be added to the dual sheath cable to provide additional signaling and power wires. Furthermore, coaxial cables are much easier and economical to splice in the field for installation and maintenance.

The present invention provides a dual coaxial data and DC power transmission system that exceeds transmission distances found with conventional Cat-5 cable. Since the 802.3u specification is not usable for the coaxial media, the present invention provides a PNET converter 400 for converting 100BaseT differential Cat-5 (100 ohm impedance) signals) to single ended coaxial (50 ohm impedance) signals and back again. In one embodiment, the PNET converter 400 may further include an amplifier 500 for boosting data signal levels from a switch output into the coaxial cable. The boosting overcomes the attenuation caused by longer transmission distances.

The present invention integrates power distribution throughout the coaxial cables of a NAN 10 to remote sites. Power distribution in this fashion is necessary because it is not acceptable to power network switches and hubs from a customer's premises power. Furthermore, it is economically prohibitive to employ 50 Amp power drops from utility power lines everywhere network device power is required. The shield of one coaxial cable may be the positive polarity and the shield of a second coaxial cable may be the negative polarity of the NAN power system. Due to the relatively low resistance of shielding and by use of high voltage switching regulators, system power may be distributed over a 4,000 foot segment of coaxial cable. Power distribution in the shields further reduces noise input into the center conductor and improves signal to noise ratios for data transmission. The capability of providing 4,000 foot long NAN distribution segments permits convenient and economical installation of distribution boxes at central locations for connection to AC line power taps as well as uplinks to the NAN servers.

The present invention provides a system to integrate power and data into a NAN. The present invention extends the distance of individual data segments between switches, pedestals and aerial boxes beyond the industry-specified maximums. The NAN system of the present invention extends the range for power distribution such that the NAN system requires at least ten times fewer power taps from power utilities than required by the industry-specified standards. The NAN system provides increased reliability and economy of data and power distribution cables. The NAN system further converts Cat-5 differential data signals to single ended coaxial cable signals to thereby extend range and to reap the benefits of hardy coaxial cable reliability.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A network system, comprising:
    a coaxial first cable configured to transmit coaxial data, wherein the coaxial first cable comprises first and second coaxial cables each having:
        a conductor configured to transmit coaxial data, and
        a shield at least partially surrounding the conductor and configured to transmit power;
    a first converter in electrical communication with the coaxial first cable and configured to convert coaxial data to differential data; and
    a switch in electrical communication with the first converter, the switch having a plurality of ports and being configured to receive and switch differential data,
    wherein the coaxial first cable and the first converter are further configured to transmit the power.

2. The network system of claim 1, wherein the first converter further comprises,
    a first transformer in electrical communication with the conductor and shield of the first coaxial cable and configured to convert differential data to coaxial data, and
    a second transformer in electrical communication with the conductor and shield of the second coaxial cable and configured to convert coaxial data to differential data.

3. The network system of claim 2, wherein the first converter further comprises an amplifier in electrical communication with the first transformer and configured to amplify coaxial data.

4. The network system of claim 2, wherein the first converter further comprises,
    a first blocking capacitor in electrical communication with the first transformer and the conductor of the first coaxial cable and configured to substantially restrict passage of power, and
    a second blocking capacitor in electrical communication with the second transformer and the conductor of the second coaxial cable and configured to substantially restrict passage of power.

5. A system comprising:
    a first cable;
    a second cable;
    a converter in electrical communication with the first cable and the second cable, wherein the converter is configured to:
        convert first differential data received from the first cable to first coaxial data and transmit the first coaxial data onto the second cable; and
        receive power and supply the power to one or more other devices through the second cable;
    wherein the second cable comprises first and second coaxial cables, wherein each of the first and second coaxial cables comprises a conductor and a shield at least partially surrounding the conductor;
    wherein the converter is configured to supply the power to the one or more devices through the shield of the first coaxial cable and the shield of the second coaxial cable.

6. The system of claim 5, wherein the converter is further configured to:
    convert second coaxial data from the second cable to second differential data, and
    transmit the second differential data onto the first cable.

7. The system of claim 6, wherein the converter is configured to transmit the first coaxial data onto the conductor of the first coaxial cable;
    wherein the converter is configured to receive the second coaxial data from the conductor of the second coaxial cable.

8. The system of claim 6, wherein the first coaxial cable is a 50 ohm coaxial cable.

9. The system of claim 6, wherein the converter comprises:
    a first transformer in electrical communication with the first cable and configured to perform said conversion of the first differential data to the first coaxial data; and
    a second transformer in electrical communication with the first cable and configured to perform said conversion of the second coaxial data to the second differential data.

10. The system of claim 9, wherein the converter further comprises:
    a first capacitor in electrical communication with a first terminal of the first transformer and with the conductor of the first coaxial cable, wherein the first capacitor is configured to pass the first coaxial data and to block passage of the power;
    a second capacitor in electrical communication with a first terminal of the second transformer and with the conductor of the second coaxial cable, wherein the second capacitor is configured to pass the second coaxial data and to block passage of the power.

11. The system of claim 10, wherein the converter further comprises an amplifier in electrical communication with the first capacitor and the conductor of the first coaxial cable and configured to amplify the first coaxial data prior to transmission of said first coaxial data onto the conductor of the first coaxial cable.

12. The system of claim 10, wherein a second terminal of the first transformer is in electrical communication with the shield of the first coaxial cable, wherein a second terminal of the second transformer is in electrical communication with the shield of the second coaxial cable.

13. The system of claim 5, where the first cable comprises Cat-5 cable.

14. The system of claim 5, wherein the second cable further comprises an outer shield at least partially surrounding the first and second coaxial cables.

15. The system of claim 5, wherein the converter further comprises auxiliary power lines and the second cable further comprises auxiliary power lines in electrical communication with the auxiliary power lines of the converter.

16. A system comprising:
a first cable configured to transmit first coaxial data;
a first converter in electrical communication with the first cable and configured to convert the first coaxial data to first differential data; and
a switch in electrical communication with the first converter and having a plurality of ports, wherein the switch is configured to receive and route packets of the first differential data to any of said ports including a first port.

17. The system of claim 16, further comprising:
a second converter in electrical communication with said first port of the switch, wherein the second converter is configured to:
convert the first differential data to second coaxial data, and
transmit the second coaxial data onto a second cable.

18. The system of claim 16, wherein the first converter is configured to receive power from the first cable and to supply the power to one or more devices including the switch.

19. The system of claim 18 further comprising:
a power manager configured to receive the power from the first converter and to perform said supplying of the power to the one or more devices;
a second converter in electrical communication with a first port of the switch and configured to convert a first portion of the first differential data to second coaxial data;
a third converter in electrical communication with a second port of the switch and configured to convert a second portion of the first differential data to third coaxial data;
wherein the power manager is configured to provide the power to the switch, the second converter and the third converter.

20. The system of claim 19, wherein the power manager includes a power switch, wherein the power manager provides the power through the power switch to at least one of the second converter and the third converter.

21. The system of claim 20, wherein the power switch is digitally controlled.

22. The system of claim 20, wherein the first converter is in electrical communication with the switch through a third cable, wherein the third cable is a Cat-5 cable.

23. The system of claim 20, further comprising a plurality of fourth cables in electrical communication with respective ports of the switch, wherein the fourth cables are Cat-5 cables.

24. A converter comprising:
a first port configured to receive first differential data from a first cable;
a first transformer in electrical communication with the first port and configured to convert the first differential data to first coaxial data;
a second port in electrical communication with the first transformer and configured to transmit the first coaxial data onto a second cable;
a third port configured to receive second coaxial data from a third cable;
a second transformer in electrical communication with the third port and configured to convert the second coaxial data to second differential data; and
a fourth port in electrical communication with the second transformer and configured to transmit the second differential data onto the first cable;
first and second conductive lines in electrical communication with a first terminal of the second port and a first terminal of the third port respectively;
wherein the second and third cables are coaxial cables, each having a conductor and a shield at least partially surrounding the conductor;
wherein the first terminal of the second port and the first terminal of the third port are configured for coupling to the shield of the second cable and the shield of the third cable respectively;
wherein the first and second conductive lines are configured to transmit power, provided by the shield of the second cable and the shield of the third cable, to one or more power output ports.

25. The converter of claim 24 further comprising:
a first capacitor in electrical communication with a first terminal of the first transformer and a second terminal of the second port, wherein the first capacitor is configured to pass the first coaxial data and block passage of the power; and
a second capacitor in electrical communication with a first terminal of the second transformer and a second terminal of the third port, wherein the second capacitor is configured to pass the second coaxial data and block passage of the power.

26. The converter of claim 24 further comprising:
auxiliary power lines configured to transmit power and configured to engage power lines exterior to the converter.

27. The converter of claim 24 further comprising:
an amplifier in electrical communication with the first transformer and the second port and configured to amplify the first coaxial data prior to transmission onto the second cable.

28. A method for transmitting data and power across a network, the method comprising:
transmitting first coaxial data and power through a first cable;
receiving the first coaxial data and the power from the first cable;
converting the first coaxial data to first differential data;
transmitting the first differential data onto a second cable;
providing the received power to one or more devices;
wherein the first cable includes a first coaxial cable and a second coaxial cable, each having a conductor and a shield at least partially surrounding the conductor, wherein said receiving the power from the first cable comprises receiving the power from the shield of the first coaxial cable and the shield of the second coaxial cable.

29. The method of claim 28, wherein said receiving the first coaxial data from the first cable includes receiving the first coaxial data from the conductor of the first coaxial cable.

30. The method of claim 28, wherein the second cable is a Cat-5 cable.

31. The method of claim 28 further comprising:
receiving second differential data from the second cable;
converting the second differential data to second coaxial data; and
transmitting the second coaxial data onto the conductor the first coaxial cable.

32. The method of claim 31, wherein said transmitting the second coaxial data onto the first cable includes transmitting the second coaxial data onto an inner conductor of the second coaxial cable.

33. The method of claim 31 further comprising amplifying the second coaxial data prior to transmission onto the first cable.

34. The method of claim 28 further comprising routing packets of the first differential data to destinations based on addresses of the packets.

35. The method of claim 34, wherein said one or more devices includes a switch configured to perform said routing of packets.

36. The method of claim 28 further comprising:
routing a first portion of the first differential data to a first converter;
the first converter converting the first portion of the first differential data into second coaxial data;
the first converter transmitting the second coaxial data onto a third cable.

37. The method of claim 36 further comprising:
routing a second portion of the first differential data to a second converter;
the second converter converting the second portion of the first differential data into third coaxial data;
the second converter transmitting the third coaxial data onto a fourth cable.

38. The method of claim 36, wherein the one or more devices include the first converter.

39. The method of claim 28, wherein the first cable also includes auxiliary power lines, wherein said receiving the power from the first cable comprises receiving the power from the auxiliary power lines of the first cable.

40. A distribution device for use in transmitting data and power, the method comprising:
a switch in electrical communication with an uplink connector and having a plurality of ports, wherein the switch is configured to receive data from the uplink connector and route packets of the data to any of said ports including a first port as differential data;
a first cable in electrical communication with said first port and configured to receive first differential data from said first port and transmit the first differential data;
a first converter in electrical communication with the first cable and configured to:
receive the first differential data from the first cable;
convert the first differential data to first coaxial data;
transmit the first coaxial data to a second cable; and
receive power from a power bus and transmit the power onto the second cable.

41. The distribution device of claim 40, wherein the first converter is further configured to:
receive second coaxial data from the second cable;
convert the second coaxial data to second differential data; and
transmit the second coaxial data to the switch through the first cable.

42. The distribution device of claim 40 further comprising:
a power control in electrical communication with the first converter through said power bus and with a second of said ports and configured to provide said power to the first converter through said power bus.

43. The distribution device of claim 42 further comprising:
a power supply in electrical communication with the power control and configured to provide power supply power to the power control, wherein the power supply power is DC power.

44. The distribution device of claim 43 further comprising:
a storage battery in electrical communication with the power supply and configured to provide battery power to the power supply.

45. The distribution device of claim 43 further comprising:
a power transformer in electrical communication with an AC power source and with the power supply and configured to provide AC power to the power supply.

46. The distribution device of claim 40, wherein the first converter comprises a transformer configured to perform said conversion of the first differential data to the first coaxial data.

47. The distribution device of claim 46, wherein the first converter comprises a capacitor in electrical communication with a first terminal of the transformer and configured to pass the first coaxial data and to block passage of the power.

48. The distribution device of claim 46, wherein the first converter comprises an amplifier in electrical communication with a first terminal of the transformer and configured to amplify the coaxial data prior to transmission onto the second cable.

49. The distribution device of claim 40 further comprising:
a third cable in electrical communication with a second of said ports and configured to receive third differential data from said second port and to transmit the third differential data;
a second converter in electrical communication with the third cable and configured to:
receive the third differential data from the third cable;
convert the third differential data to third coaxial data;
transmit the third coaxial data to a fourth cable; and
receive the power from the power bus and transmit the power onto the fourth cable.

50. The distribution device of claim 40, wherein the first cable comprises a Cat-5 cable.

* * * * *

UNITED STATES PATENT AND TRADEMARK OFFICE
CERTIFICATE OF CORRECTION

PATENT NO.          : 7,072,407 B2                                    Page 1 of 1
APPLICATION NO. : 09/753747
DATED               : July 4, 2006
INVENTOR(S)         : Alma K. Schurig It is certified that error appears in the above-identified patent and that said Letters Patent is hereby corrected as shown below:

In the Claims:

Column 15
Line 60, please delete "The system of claim 20" and substitute
-- The system of claim 16 --;

Column 15
Line 63, please delete "The system of claim 20" and substitute
-- The system of claim 16 --;

Column 17
Line 47, please delete "power, the method comprising" and substitute
-- power, the device comprising --.

Signed and Sealed this

Seventh Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 7,072,407 B2 Page 1 of 1
APPLICATION NO. : 09/753747
DATED : July 4, 2006
INVENTOR(S) : Schurig It is certified that error appears in the above-identified patent and that said Letters Patent is hereby corrected as shown below:

In column 13, claim 1, line 2, cancel the first occurrence of the word "coaxial", i.e., that occurrence within the phrase "coaxial first cable".

In column 13, claim 1, line 3, cancel the word "coaxial", i.e., where that word occurs as part of the phrase "coaxial first cable".

In column 13, claim 1, second-to-last line, cancel the word "coaxial", i.e., where that word occurs as part of the phrase "coaxial first cable".

Signed and Sealed this

Twenty-second Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,072,407 B2 Page 1 of 1
APPLICATION NO. : 09/753747
DATED : July 4, 2006
INVENTOR(S) : Schurig It is certified that error appears in the above-identified patent and that said Letters Patent is hereby corrected as shown below:

In column 13, claim 1, line 44, cancel the first occurrence of the word "coaxial", i.e., that occurrence within the phrase "coaxial first cable".

In column 13, claim 1, line 45, cancel the word "coaxial", i.e., where that word occurs as part of the phrase "coaxial first cable".

In column 13, claim 1, line 55, cancel the word "coaxial", i.e., where that word occurs as part of the phrase "coaxial first cable".

This certificate supersedes the Certificate of Correction issued July 22, 2008.

Signed and Sealed this

Twelfth Day of August, 2008

JON W. DUDAS
*Director of the United States Patent and Trademark Office*